Jan. 16, 1962 P. A. DENES 3,016,597
CERAMIC DIPPING PROCESS
Filed April 24, 1958 2 Sheets-Sheet 1
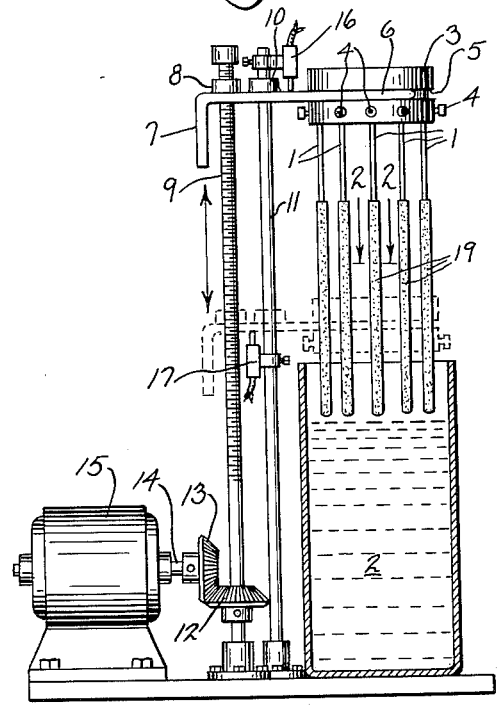
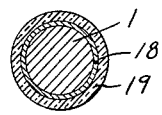
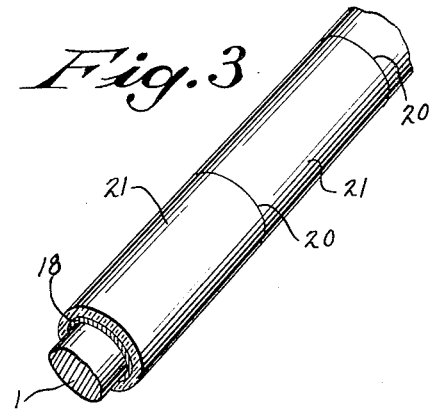
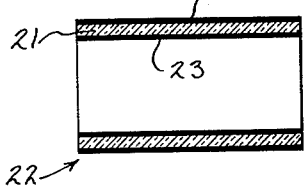
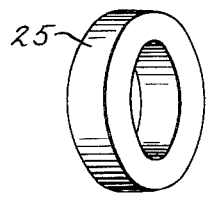
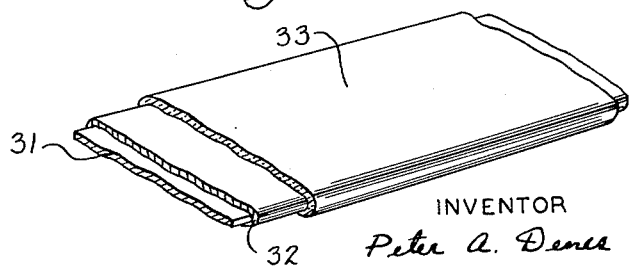
INVENTOR
Peter A. Denes
BY Quarles, Fox, Seidel, Bateman & Hoar
ATTORNEYS Jan. 16, 1962 P. A. DENES 3,016,597
CERAMIC DIPPING PROCESS
Filed April 24, 1958 2 Sheets-Sheet 2
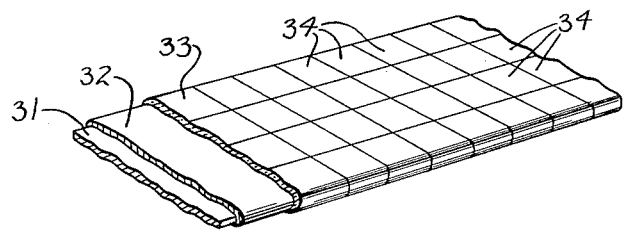
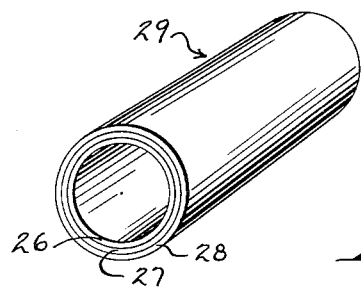
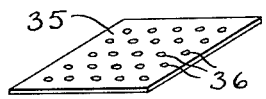
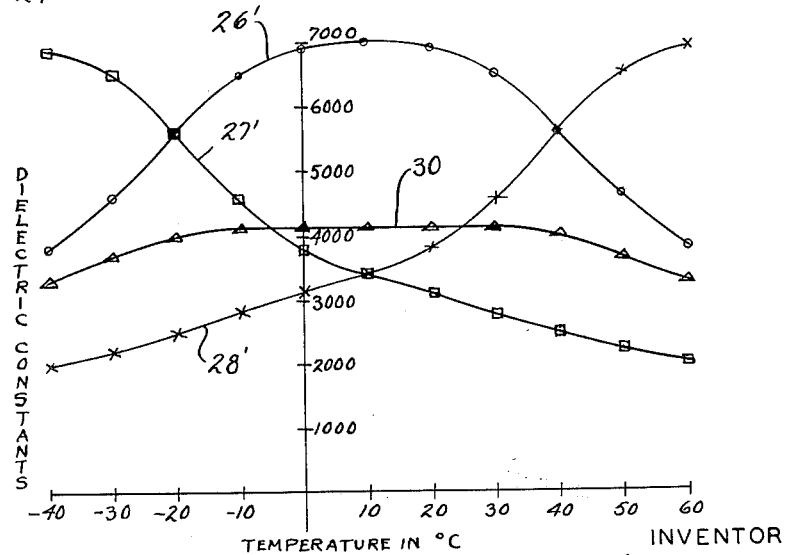
INVENTOR
Peter A. Denes
BY Quarles, Fox, Seidel, Bateman & Hoar
ATTORNEYS United States Patent Office 3,016,597
Patented Jan. 16, 1962

3,016,597
CERAMIC DIPPING PROCESS
Peter A. Denes, 2934 N. Downer, Milwaukee, Wis.
Filed Apr. 24, 1958, Ser. No. 731,582
5 Claims. (Cl. 25—156)

The present invention relates to ceramic bodies and their preparation, and it more particularly resides in ceramic bodies of thin cross section which are particularly adapted to form components for electrical circuits, such as capacitors, ferrite memory cores and other members of like nature.

The known methods for producing relatively thin ceramic bodies of substantially constant cross section are pressure molding in suitable molds or extrusion of the ceramic material through preselected die forms. In each instance a ceramic powder is usually blended to predetermined formulae and admixed with an organic binder and plasticizer, the organic components being removed during subsequent firing of the formed body. These techniques require a minimum wall thickness for the body to lend sufficient strength for withstanding the stresses encountered in manufacturing. For example, a body must have a dimension sufficient to hold itself together during removal from a mold or die. Such limitations due to manufacturing processes have heretofore restricted the minimal thickness obtainable to the order of ten mils (0.010 inch).

There are numerable instances wherein it would be of advantage to decrease the wall thickness of ceramics for capacitor dielectrics and ferrite applications. The present invention pertains to the obtainment of such reduced cross section dimensions, making it possible to manufacture such ceramics with a thickness of but two mils. Certain electrical advantages flow from such a reduction of cross section. For example, in the case of ceramic capacitors it is fundamental that capacitance may be raised proportionally by diminishing the distance between plates. Since breakdown voltage of thin sections is relatively better than for thicker sections it then follows that the use of capacitor dielectrics of reduced section may be used to advantage. As another example, the miniaturization of ferrite memory cores permits a corresponding decrease of the necessary current drive for attaining a magnetized state. As a result new systems may be possible in which transistors alone supply the necessary magnetizing currents.

It is, therefore, an object of this invention to provide an improved method of forming a ceramic body of substantially constant cross section having a wall thickness of ten mils or less.

It is another object of the present invention to provide relatively thin ceramic bodies for electrical circuit components, and in particular to provide bodies of this characteristic for capacitors and ferrite memory cores.

It is a further object of this invention to provide a ceramic body comprising a plurality of layers of differing ceramics which have varying individual characteristics to thereby obtain a desired composite characteristic. These characteristics may pertain to such factors as dielectric constant, temperature coefficient of expansion, Curie point temperature, and crystalline orientation.

It is still another object of this invention to provide a ceramic body for an electrical circuit component wherein the body has a dielectric constant of substantially constant value over a relatively broad temperature range.

A still further object of this invention is to provide a ferrite memory device having a substantially square hysteresis loop characteristic.

In the drawings:

FIG. 1 is a side view in elevation and in section of an apparatus adapted for use in the preparation of a ceramic body constructed in accordance with the present invention, FIG. 2 is an enlarged view in cross section of a forming rod and a ceramic deposited thereon, the view being taken in plane 2—2 of FIG. 1.

FIG. 3 is a fragmentary view in perspective of a forming rod with a ceramic coating, FIG. 4 is an enlarged longitudinal view in cross section of a capacitor manufactured in accordance with the present invention, FIG. 5 is a view in perspective of a ferrite memory core manufactured according to the invention, FIG. 6 is a fragmentary view in perspective of a partially completed ceramic sheet being manufactured in accordance with the invention, FIG. 7 illustrates the ceramic of FIG. 6 after a further step in the manufacture thereof has been carried out, FIG. 8 is a view in perspective of a ceramic tube embodying the invention and adapted to be used as a capacitor dielectric, FIG. 9 is a perspective view of a ferrite memory plate array which is in accordance with the invention, and FIG. 10 is a graph of the dielectric constant with respect to temperature for both a composite capacitor dielectric embodying the invention, and a plurality of individual dielectric materials used in composing the composite capacitor.

The practice of manufacturing, in accordance with the present invention, renders, possible the production of ceramic bodies of substantially constant cross section having a wall thickness ranging downward to two mils. The invention is consequently of particular use in the thickness range of two to ten mils, but is also well adapted for producing ceramics of greater thickness. In general, the initial manufacturing step for a tubular capacitor such as in FIG. 4, or a ring shaped ferrite as in FIG. 5, consists in providing a rod like form 1 of a selected outer configuration that will establish the inner diameter, or bore, of the finished product, and then dipping the form 1 into a ceramic slurry or suspension 2 to form a coating upon the form 1. For further embodiments of the invention having different geometries, such as flat wafers or discs, a different shaped form will be selected, as will be hereinafter described. The initial discussion, however, will relate to a tubular construction for which a slightly tapered rod will function as the form 1.

The ceramic slurry 2 comprises a preselected ceramic powder which has, in its final fired state, certain desired characteristics, such as a particular dielectric constant in the case of a dielectric material for a capacitor, or a particular magnetic hysteresis loop for a ferrite powder. The slurry 2 preferably includes a binder to provide sufficient inherent strength in an unfired coating which is deposited on the form 1, then dried, and then removed from the form, as will be hereinafter described. The strength imparted by the binder must be sufficient for removal from the form, and then maintaining the shape of the ceramic body prior to and during a firing cycle. The binder is generally of an organic substance, which will then be burned off and removed during the subsequent firing. In addition to the binder it is also desirable to provide a plasticizer in the slurry 2, as well as a number of solvent materials preferably having relatively different vapor pressures to provide a smoother evaporation or drying effect during the formation of the ceramic body.

Referring specifically now to FIG. 1, there is disclosed an apparatus for alternately immersing and withdrawing a plurality of the rod like forms 1 into and from the slurry 2. The forms 1 are each inserted into appropriate spaced openings on the underside of a cylindrical fixture 3, and are clamped in place by means of thumb screws 4. The fixture has a circumferential groove 5 which receives the horizontal arms 6 of a bifurcated bracket 7. In this fashion the fixture 3 is supported above the slurry 2 with the rod like forms 1 in a position to be raised and lowered. The bracket 7 has an internally threaded boss 8 which is in threaded engagement with a vertically disposed rotatable drive shaft 9, and also has a pair of bosses 10, one of which is seen in FIG. 1, which have a sliding fit with a pair of laterally spaced vertical guide shafts 11. A rotation of the drive shaft 9 will cause the bracket 7 to be moved vertically, while retaining the forms 1 in alignment with the slurry 2.

The drive shaft 9 includes a bevel gear 12 at its lower end which is in mesh with a driving bevel gear 13. The gear 13 is keyed to the output shaft 14 of a reversible motor 15. Thus, operation of the motor 15 causes movement of the forms 1, the direction of which movement is dependent upon the direction of motor rotation. A pair of limit switches 16 and 17 are mounted upon a guide shaft 11 to be actuated by vertical movement of the bracket 7. The switches 16, 17 are connected in the control circuit for the motor 15 in a manner that a descent of the bracket 7 against the switch 17 will cause a reversal of the motor 15 to drive the bracket 7 upwardly, and an ascent of the bracket 7 against the switch 16 will also cause a motor reversal. Alternate descent and ascent of the forms 1 into and from the ceramic slurry 2 is thus obtainable. Obviously, other means may be provided to lower and raise the bracket 7 and its forms 1.

To commence the manufacture of a ceramic body in accordance with the invention the rod like forms 1 are first coated with a thin bedding layer of thermoplastic, or thermosoftening, material 18 which may be termed as a release composition; and in FIG. 2, which is a view in section of a form 1 after being dipped in the slurry 2, there is shown a thin layer of such material 18 encircling the form 1. After the thermosoftening layer 18 is in firm adherent contact with each form 1, the fixture is moved downwardly to carry the forms 1 into the ceramic slurry 2. Upon submersion the forms 1 are retracted upwardly at a desired rate to leave a thin coat 19 of ceramic on the rod 1. The ceramic slurry 2 has a solvent content such that drying commences immediately upon removal of the forms 1 from the slurry 2. This causes the ceramic coat 19 to set-up in an adherent layer surrounding the thermosoftening material 18.

The immersion of the forms 1 may be repeated to build up an accretion of the ceramic deposit, and thereby increase the thickness of the ceramic coat 19 to desired dimension. To attain the desired thickness of the ceramic coat 19, the viscosity of the slurry 2 and the number of immersions may be selected upon trial, and then careful control of the selected conditions is desirable. The layer of ceramic material may also be deposited by methods other than alternate immersion and withdrawal from a slurry solution. For example, an electrodeposition such as cataphoresis may be employed, and in this mode of operation the electrical current and time are important factors to be considered in the control of thickness of the coat 19.

After the deposition of the coat 19 is completed it presents a green ceramic mixture that is quite soft, but of sufficient strength to retain its shape. The major proportion of the solvents rapidly dries to achieve this firm green state, and while in this state the coat 19 may be subdivided by circumferential cuts 20, as shown in FIG. 3. In this manner discrete ceramic bodies 21 are formed.

Following the formation of the bodies 21 the form 1 and its ceramic coating is heated to a temperature that softens the thermosoftening material 18. A temperature of 70° C. may be typical of this step, and upon occurrence of the softening the bodies 21 may be removed from the form 1. The material 18 acts as a lubricant that facilitates the removal. Next the bodies 21 are fired at elevated temperatures as are commonly known in the ceramic art, to thereby cure the ceramic bodies 21. In this final heat treatment organic binders are burned, to leave ceramic itself.

Inasmuch as conventional binders used with ceramic materials tend to adhere to a form, as well as the ceramic, it is difficult to avoid damaging a body during removal from the form. This is especially a problem in the case of bodies having relatively thin wall thicknesses, such as the order of from two to ten mils. In addition, binders have a tendency to shrink during drying, which makes it more difficult to remove a body from a form, and which may also cause cracking. To eliminate these difficulties, the present invention contemplates the application of the layer of material 18 to the form 1. As has been noted, the material 18 is preferably of a thermoplastic, or thermosoftening, nature which may be melted or softened by heating prior to the removal of the dried ceramic bodies 21 from the form 1. It is contemplated, however, that the layer formed of material 18 may also be selected from substance which may dissolve in selected solvents upon drying of the ceramic coating. The solvent chosen for the material should be selected from those that are inert with respect to the ceramic coating constituents, including both the binder and the plasticizer.

In the case of a thermosoftening substance, the material 18 should be selected from those capable of being completely removed during the ceramic firing cycle. This is especially true, should the material 18 have a tendency to remain upon a dried body 21 after the body 21 is removed from the form 1. I have found that organic, microcrystalline waxes, e.g. ceresin or beeswax, may be applied or deposited on the form 1 by dipping or spraying from a solvent solution thereof or from a melt of a wax. These waxes provide a resilient layer which tends to cushion the effect of shrinkage of the drying ceramic coating 19, and which are readily softened at temperatures from approximately 70° C. to 100° C. to permit easy removal of the dried ceramic bodies 21 without deleteriously affecting the form of the ceramic. These particular waxes also readily burn off during firing.

Specific examples of the method and articles produced in the practice of the invention will next be described.

*Example 1*

For the production of ceramic tubes for capacitor dielectrics having an outer diameter, when fired, of 0.050 inch, a wall thickness of 0.004 inch and a length of 0.300 inch, a finely grounded steel rod is provided as a preshaped form 1 and is ground to a diameter of 0.060 inch. For this example reference may be made to FIG. 1, since this example is a specific practice of the foregoing description, which made reference to FIGS. 1, 2 and 3. The forms 1 are of a length of 8 inches and preferably taper at a ratio of 1:10,000, and a number of the forms 1 are clamped in the fixture 3. The forms 1 are first dipped into molten paraffin wax held at a temperature of approximately 70° C., to deposit a bedding layer 18 of about 0.5 to 1 mil thickness. Alternate immersion and withdrawal from the wax may be practical if desired. After solidification the layer 18 is wetted with benzene or toluene to insure a properly prepared surface that will readily be wetted by the ceramic slurry 2. Next, the wax coated forms 1 and fixture 3 are placed in the apparatus of FIG. 1, and the forms 1 are immersed and withdrawn five times in and from the following ceramic slurry:

100 parts ceramic powder of a high dielectric constant comprising a mixture of 90% $BaTiO_3$ and 8% $CaZrO_3$ and 2% $BaZrO_3$
8 parts cellulose acetate
1 part dibutyl phthalate
70 parts acetone
30 parts butyl acetate
40 parts ethyl Cellosolve (a ketone solvent)

It is to be noted that it is preferred to provide a substantially uniform withdrawal of the forms 1 from the slurry 2 to provide a uniform ceramic coat 19 thereon. In the slurry 2 it will be apparent that the cellulose acetate is provided as a binder and the dibutyl phthalate is provided as a plasticizer to minimize excessive shrinkage and/or rigidity of the deposited layer or layers. The remaining solvents are selected for their variance in evaporating temperatures, to thus provide a continuous, smooth evaporation which will not cause bubbles or unevenness on the surface of the ceramic body. Acetone is the best solvent for cellulose acetate, but it alone tends to evaporate very rapidly. Cellosolve is the second fraction and butyl acetate has the slowest evaporation rate. Enumerable other combinations might be used to provide equal or satisfactory results.

After the fifth immersion, the partially dried ceramic coat 19 may be cut or severed in situ upon the form 1 by means of a sharp blade. To provide the desired fired length of 0.300 inch, the ceramic coat 19 is severed at spaced apart points of 0.420 inch. The form 1 with the various coatings thereon is then heated to approximately 70° C. in an oven or by means of an infrared lamp, at which temperature the ceramic bodies 21 in the form of short tubes may be readily removed by sliding from the form 1. The tubular cylindrical bodies 21 are then fired at the proper sintering temperature for the ceramic material, and ceramic bodies 21 with desired dimensions result. Utilizing a high dielectric constant material, such as that suggested above, ceramic capacitors of 10,000 m.m.f. may be obtained upon the application of the electrode plate material. For instance, a tubular capacitor 22 is illustrated in FIG. 4 as comprising an elongated tubular ceramic body 21 with silver deposited inner and outer electrodes 23 and 24.

*Example 2*

For the production of sub-miniature ferrite memory cores having a substantially rectangular hysteresis loop, finely ground steel rods are selected of a diamter of 0.030 inch and having a tapering ratio of 1:10,000. The rods are dipped into a 20% ceresin wax-benzene solution. (Ceresin is a mixture of hydrocarbons of complex composition providing a white or yellow wax, which is odorless and very often substituted for beeswax.) Upon air drying a wax layer of 0.5 mil remains on the steel rod. The rod may then be sprayed with a ferrite powder dispersed in Du Pont RK–935, a methacrylate clear resin. The ferrite powder blend, in the present example, is a magnesium manganese ferrite comprising 0.3 mol $MgFe_2O_4$ and 0.7 mol $MnFe_2O_4$.

The sprayed coating is then permitted to dry and is cut in situ upon the rod into lengths of 0.030 inch. Upon heating the entire assembly to a temperature of 100° C., the cut rings will readily slip from the rod to provide ferrite memory rings, such as the ring 25 illustrated in FIG. 5, having an outer diameter, upon firing, of 0.025 inch, an inner diameter of 0.020 inch and a length of 0.020 inch. Memory cores having thin wall thicknesses, such as those produced under the present method, have an enhanced squareness in the hysteresis loop and for a given field strength require less driving current. Hence, the invention makes possible the attainment of ferrite cores not heretofore had, which have improved electrical characteristics.

*Example 3*

The present example will be described in connection with FIG. 10 of the drawings, wherein there is illustrated a graph having an abscissa identified by the dielectric constant of selected materials, and an ordinate identified by temperature in degrees centigrade. Curves 26', 27' and 28' present the temperature-dielectric constant relation of three corresponding high K dielectric materials 26, 27 and 28 shown as separate layers in the tubular body 29 of FIG. 8. It is an object of this particular example to secure a composite dielectric constant which has less variation with temperature than any of the three individual materials, and a typical composite curve that may be obtained is represented by curve 30 in FIG. 10. The layers of ceramic dielectric materials 26, 27, 28 is obtained by dipping a rod like form in three different slurrys or suspensions. The radially inner material 26 is built up into a dried coat before dipping into the ceramic material 27, and after the material 27 becomes a firm coat, then the outer material 28 is applied. The particular ceramic materials 26, 27, 28 of this example were chosen with like peak value dielectric constants, but with differing Curie points which accounts for the peak values occurring at different temperature values. The usual dielectrics comprised of titanates have a very substantial change in their dielectric constants with temperature, as is clearly shown in curves 26', 27' and 28', which causes circuit parameters to unduly shift with temperature change. By achieving a composite curve 30 this shift with temperature is minimized, and hence the invention may be utilized to secure more desirable capacitor dielectrics from the high K ceramics.

In carrying out the present example three ceramic materials have been used as follows:

The material 27 having a Curie point at −50° C. comprises 88% $BaTiO_3$, 2% $BaZrO_3$, 8% $CaZrO_3$ and 2% $Bi_2(SnO_3)_3$.

The material 26 having a Curie point at approximately 10° C. comprises 90% $BaTiO_3$, 2% $BaZrO_3$ and 8% $CaZrO_3$.

The material 28 having a Curie point at plus 70° C. comprises 89.5% $BaTiO_3$, 2% $BaZrO_3$, 8% $CaZrO_3$ and 0.5% $SnO_2$.

The resulting dielectric constant K for any given temperature is obtained according to the following relation which is based upon the assumption that the layers are of uniform thickness.

$$\frac{3}{K} = \frac{1}{K(26)} + \frac{1}{K(27)} + \frac{1}{K(28)}$$

The resulting product varies only ±10% between −40° C. and plus 60° C., and only ±1.3% between −20° C., and +40° C., although the change in the constituent dielectric constants is more than 200% between −40° C. and +60° C.

*Example 4*

A tubular body having two concentric layers of differing ceramic blends was produced with the blends being selected to provide slightly different shrinkage ratings. The material with the greater shrinkage surrounds the material having the lesser shrinkage value. Thus, the tube when fired will shrink non-uniformly to provide a stable body in which the inner stresses influence the polycrystalline structure of the material. It is a discovery of the invention that in this manner a substantially square hysteresis loop may be obtained for ferrite materials which heretofore generally did not show such characteristic. Also, by directing the crystallites of a dielectric material through the creation of internal stresses the capacity of a condenser may be enlarged.

In the case of the production of a tubular ferrite memory core, as described in the preceding paragraph, two differing ferrite blends were applied to a steel rod in a manner similar to that of Example 2. After applying a wax layer to the rod, a coating was sprayed thereon which comprised a ferrite powder blend dispersed in methacrylate clear resin. The ferrite powder consisted of a mixture of 0.15 mol $MgFe_2O_4$ and 0.85 mol $MnFe_2O_4$. After the first coating was applied, a second coating of 0.6 mol $MgFe_2O_4$ blended with 0.4 mol $MnFe_2O_4$ was applied in like manner. Upon drying, cutting to size and removing from the rod, the bodies were fired to provide ferrite cores having substantially square looped hysteresis characteristics.

*Example 5*

With reference now to FIG. 6 of the drawings, a 4 inch wide and 0.04 inch thick endless steel ribbon 31 was pulled through a molten microcrystalline wax bath, which covered the ribbon with a wax layer 32 of approximately 1 mil thickness. The ribbon 31 was then moved to an immersion station including a suspension or slurry comprising the following components:

100 parts ceramic powder of high dielectric, constant having a composition of 90% $BaTiO_3$, 2% $BaZrO_3$ and 8% $CaZrO_3$.
10 parts cellulose acetate butyrate
2 parts dioctyl phthalate
40 parts butyl acetate
30 parts methyl ethyl ketone The ribbon 31 was passed through the slurry, with the speed of travel of the ribbon 31 and the length being immersed such that a ceramic layer 33 of approximately 4 mils in thickness was deposited thereon. Upon drying, the layer 33 was cut into square bodies as shown in FIG. 7, of 0.040 inch side dimensions. The entire assembly including the ribbon 31, wax layer 32 and ceramic layer 33 was then moved to a warming station (not shown) wherein the wax was melted and the square ceramic bodies 34 were removed from the ribbon 31. The bodies 34 were then fired and provided a final dimension of 0.03 inch in width and length and a thickness of 0.003 inch. These thin square bodies may be utilized to form a stacked capacitor, and after plates are affixed, a capacitance of 0.2 m.m.f. has been obtained from a stacked cube of 0.030 inch side dimension.

*Example 6*

By a method like that described in Example 5, ferrite memory plates 35, as shown in FIG. 9, were provided, upon firing of a thickness of 0.004 inch and 0.080 inch on a side. Prior to firing, twenty-five holes 36, of a diameter of 0.010 inch were punched in the plate. This operation may be performed while the plate 35 is on a ribbon form, or after its removal, if so desired. After firing the plate 35 will operate as a memory array of twenty-five positions, when wired in the usual manner.

It will be apparent that the present invention provides a new and novel method of manufacturing ceramic bodies of substantially constant cross section, which bodies have application in the manufacture of capacitors and ferrite memory cores, as well as plate-like ferrite memory arrays. The invention may also be used to provide wafer-like ceramic plates serving as a base for capacitor production. In addition, new articles of manufacture in the form of ferrite memory cores having substantially square loop hysteresis curves may be obtained, as well as electric capacitors in which the dielectric constant remains uniform over a broad operating range of temperature.

I claim:

1. A method of manufacturing ceramic bodies of tubular cross section, said method comprising the steps of coating a surface portion of an elongated rod with a liquifiable release composition of a thickness sufficient to cushion shrinkage forces exerted by a later deposited shrinkable coating; depositing upon an exposed surface of said release composition at least one layer of a ceramic powder blend from a slurry mixture thereof, wherein said powder is suspended in a solution of a plurality of liquids of respectively differing vapor pressures; drying the ceramic deposit in situ; severing the dried ceramic deposit peripherally of said rod at axially spaced points along said rod to provide a plurality of individual tubular ceramic bodies; liquifying the release composition; removing said bodies from said liquified release coated rod; and firing said tubular bodies.

2. A method of manufacturing ceramic bodies of tubular cross section, said method comprising the steps of coating a surface portion of an elongated rod with a liquifiable release composition of a thickness sufficient to cushion shrinkage forces exerted by a later deposited shrinkable coating; alternately immersing and withdrawing said coated rod into and out of a liquid suspension including a ceramic powder blend suspended in a solution of a plurality of liquids of respectively differing vapor pressures; drying the ceramic deposit in situ; severing the dried ceramic deposit peripherally of said rod at axially spaced points along said rod to provide a plurality of individual tubular ceramic bodies; liquifying the release composition; removing said bodies from said liquified release coated rod; and firing said tubular bodies.

3. A method of manufacturing ceramic bodies of tubular cross section, said method comprising the steps of coating a surface portion of an elongated rod with a liquifiable release composition of a thickness sufficient to cushion shrinkage forces exerted thereon by a later deposited shrinkable coating; depositing upon an exposed surface of said release composition concentric layers of ceramic powder blends from a slurry mixture thereof, wherein said powder blends are each suspended in a solution of a plurality of liquids of respectively differing vapor pressures, and wherein the outermost layer is comprised of a blend having a relatively greater shrinkage coefficient than an adjacent inner layer; drying the ceramic deposit in situ; severing the dried ceramic deposit peripherally of said rod at axially spaced points along said rod to provide a plurality of individual tubular ceramic bodies; liquifying the release composition; removing said bodies from said liquified release coated rod; and firing said tubular bodies.

4. In the method of manufacturing of tubular electrical capacitors, the preparation of dielectric bodies therefor, said bodies having a fired wall thickness ranging between approximately 2 mils and 10 mils, the steps of coating a surface portion of an elongated rod with a liquifiable release composition of a thickness of between about 0.5 mil and about 2 mils; depositing upon an exposed surface of said release composition a series of concentric layers, each layer comprising a coating consisting of a ceramic powder blend of high dielectric constant and characterized on firing by a Curie point of a value differing from that of an adjacent layer, each of said powder blends being suspended in a solution of a plurality of liquids of respectively differing vapor pressures; drying the ceramic deposit in situ; severing the dried ceramic deposit peripherally of said rod at axially spaced points along said rod to provide a plurality of individual tubular ceramic bodies; liquifying the release composition; removing said bodies from said liquified release coated rod; and firing said tubular bodies.

5. In the method of manufacturing ceramic bodies of tubular cross section the preparation of ferrite bodies having a fired wall thickness ranging between approximately 2 mils and 10 mils, the steps of coating a surface portion of an elongated rod with a liquifiable release composition of a thickness of between about 0.5 mil and about 2 mils; deposition upon an exposed surface of said release composition a series of concentric layers, each layer comprising a coating consisting of a ferrite powder blend characterized on firing by a Curie point of a value differing from that of an adjacent layer, each of said powder blends being suspended in a solution of a plurality of liquids of respectively differing vapor pressures; drying the ceramic deposit in situ; severing the dried ceramic deposit peripherally of said rod at axially spaced points along said rod to provide a plurality of individual tubular ceramic bodies; liquifying the release composition; removing said bodies from said liquified release coated rod; and firing said tubular bodies.

(Other references on following page)

References Cited in the file of this patent

UNITED STATES PATENTS

| | | |
|---|---|---|
| 626,088 | Paine | May 30, 1899 |
| 2,339,003 | Boer et al. | Jan. 11, 1944 |
| 2,385,578 | Kaschke | Sept. 25, 1945 |
| 2,486,410 | Howatt | Nov. 1, 1949 |
| 2,554,327 | Gravley | May 22, 1951 |
| 2,569,163 | Gravley | Sept. 25, 1951 |
| 2,797,370 | Bennett | June 25, 1957 |
| 2,799,912 | Greger | July 23, 1957 |
| 2,814,849 | Hamilton | Dec. 3, 1957 |

FOREIGN PATENTS

| | | |
|---|---|---|
| 482,104 | Great Britain | Aug. 16, 1937 |